United States Patent
Marvin et al.

(10) Patent No.: US 11,251,681 B2
(45) Date of Patent: Feb. 15, 2022

(54) FIXTURE AND METHOD OF SECURING PARTS USING THE SAME

(71) Applicant: LCDRIVES CORP., Goshen, CT (US)

(72) Inventors: Russel H. Marvin, Goshen, CT (US); Dylan Broomfield, Potsdam, NY (US); David Leach, Potsdam, NY (US)

(73) Assignee: KOCH ENGINEERED SOLUTIONS, LLC, Wichita, KS (US)

( * ) Notice: Subject to any disclaimer, the term of this patent is extended or adjusted under 35 U.S.C. 154(b) by 345 days.

(21) Appl. No.: 15/394,522

(22) Filed: Dec. 29, 2016

(65) Prior Publication Data

US 2017/0194838 A1    Jul. 6, 2017

Related U.S. Application Data

(60) Provisional application No. 62/273,580, filed on Dec. 31, 2015.

(51) Int. Cl.
| | |
|---|---|
| *H02K 9/00* | (2006.01) |
| *H02K 15/02* | (2006.01) |
| *H02K 1/16* | (2006.01) |
| *H02K 1/04* | (2006.01) |

(52) U.S. Cl.
CPC ............. *H02K 9/00* (2013.01); *H02K 1/04* (2013.01); *H02K 1/16* (2013.01); *H02K 15/026* (2013.01)

(58) Field of Classification Search
CPC ............ H02K 1/20; H02K 1/32; H02K 1/325; H02K 3/22; H02K 3/24; H02K 9/00; H02K 9/005; H02K 9/04

USPC ............ 310/52, 54, 57, 58, 59, 64, 214, 215
See application file for complete search history.

(56) References Cited

U.S. PATENT DOCUMENTS

| | | | | |
|---|---|---|---|---|
| 5,189,325 | A * | 2/1993 | Jarczynski | H02K 9/19 310/54 |
| 6,313,556 | B1 * | 11/2001 | Dombrovski | H02K 3/24 29/596 |
| 8,816,546 | B2 * | 8/2014 | Bywaters | H02K 1/16 310/54 |
| 2003/0011253 | A1 * | 1/2003 | Kalsi | H02K 1/12 310/58 |
| 2008/0197724 | A1 * | 8/2008 | Cullen | H02K 9/005 310/53 |
| 2015/0028728 | A1 * | 1/2015 | Carpentier | H02K 9/19 310/60 A |

* cited by examiner

*Primary Examiner* — Nguyen Tran
(74) *Attorney, Agent, or Firm* — Tarolli, Sundheim, Covell & Tummino LLP (57) ABSTRACT

A method for securing metallic first and second parts together includes positioning filler metal along an interface between the first and second parts. The first and second parts are inserted into a fixture such that at least one of the first and second parts engages the fixture. The fixture is heated with at least one electrical heating element to heat the filler metal by thermal conduction above a melting point of the filler metal and form metallurgical bonds between the filler metal and the first and second parts. The melted filler metal is cooled to join the first and second parts together.

28 Claims, 12 Drawing Sheets

FIXTURE AND METHOD OF SECURING PARTS USING THE SAME

RELATED APPLICATIONS

This application claims the benefit of U.S. Provisional Application No. 62/273,580, filed Dec. 31, 2015, the entirety of which is incorporated herein by reference.

TECHNICAL FIELD

The present invention relates to cooling device and, in particular, relates to a fixture for securing together components of a cooling device.

BACKGROUND

Soldering and brazing are processes in which two metal parts are joined by melting a filler metal between joints of the parts and then letting the filler metal solidify. In brazing, the filler metal is selected to have a lower melting temperature than the melting point of either part being joined and, thus, neither joined part is metaled in the process. Soldering uses filler metals having a lower melting temperature than the brazing filler metal melting temperature. As a result, lower strength joints are formed in soldering compared to brazing but the soldered connection is desirable for joining heat-sensitive assemblies.

The particular flux used in the soldering process is important. Flux is a corrosive material added to the joints along with the filler metal. It removes oxidation from the joined metal parts, which allows surfaces of the solder to more efficiently bond to metals. A typical soldering process involves cleaning the surfaces of the metal parts, applying flux to those surfaces, applying the solid filler metal in the joints, and then heating the parts. The filler metal is either put in place before heating or fed in during heating. Many different heating processes can then be used to accomplish the solder joint. It would be desirable to accurately control the temperature of the parts being soldering during the soldering or brazing process—called the reflow profile. One context in which precisely controlling the reflow profile would be advantageous is in the production of cooling bars for motors or generators.

SUMMARY

A method for securing metallic first and second parts together includes positioning filler metal along an interface between the first and second parts. The first and second parts are inserted into a fixture such that at least one of the first and second parts engages the fixture. The fixture is heated with at least one electric heating element to heat the filler metal by thermal conduction above a melting point of the filler metal and form metallurgical bonds between the filler metal and the first and second parts. The melted filler metal is cooled to join the first and second parts together.

In another example, a cooling bar for a winding slot of an electric rotary machine includes a thermally conductive pipe defining a plurality of coolant passageways and a tab secured to the pipe along an interface by filler metal metallurgically bonded to the tab and the pipe.

A method for securing metallic first and second parts together includes positioning filler metal along an interface between the first and second parts. The first and second parts are inserted into a fixture such that at least one of the first and second parts engages the fixture. The fixture is heated with an electrical heating element in contact with the fixture to heat the filler metal by thermal conduction above a melting point of the filler metal and form metallurgical bonds between the filler metal and the first and second parts. Power supplied to the heating element is varied over time to heat the fixture over a predetermined heating curve. At least one of a liquid and a gas is flowed through a cooling channel in the fixture to cool the melted filler metal and join the first and second parts together.

Other objects and advantages and a fuller understanding of the invention will be had from the following detailed description and the accompanying drawings

DETAILED DESCRIPTION

Figure 1:
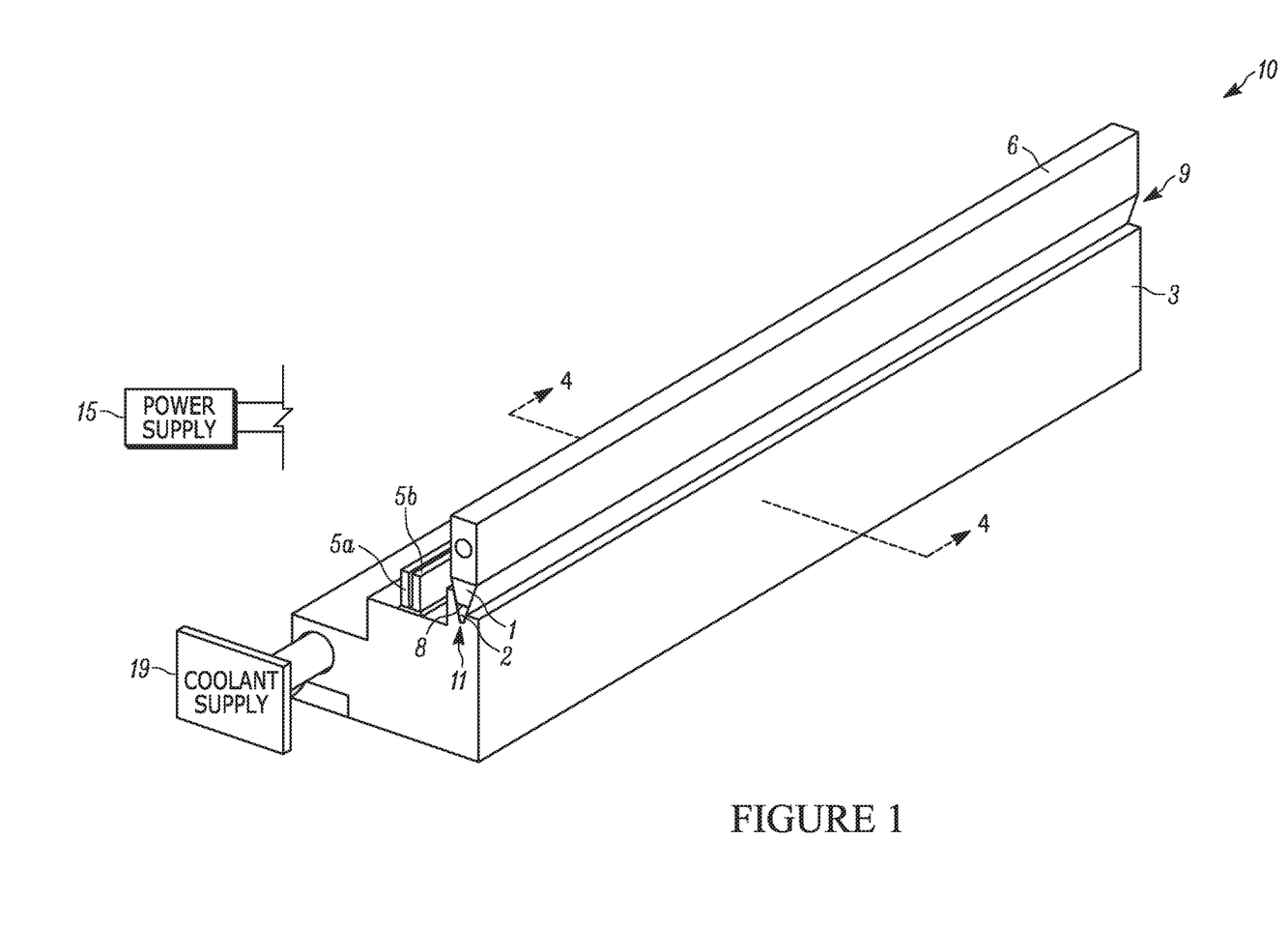
FIG. 1 is a schematic illustration of a fixture for securing parts together in accordance with the present invention.
Figure 2:
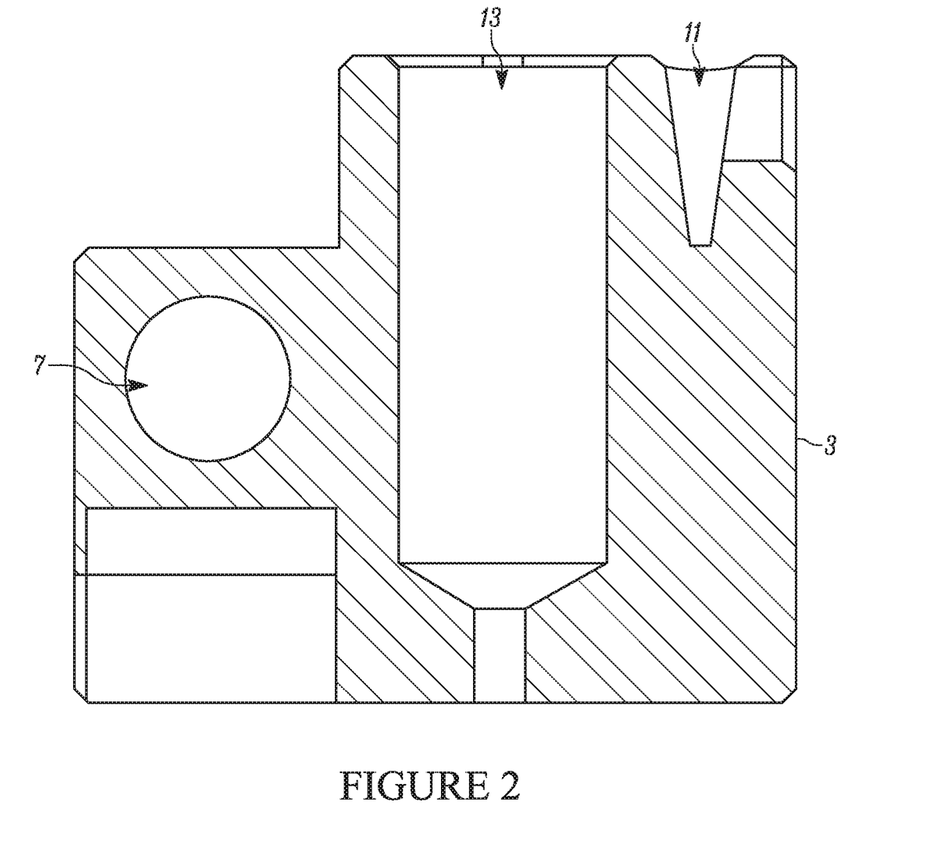
FIG. 2 is a cross-sectional view of the fixture of FIG. 1.
Figure 3:
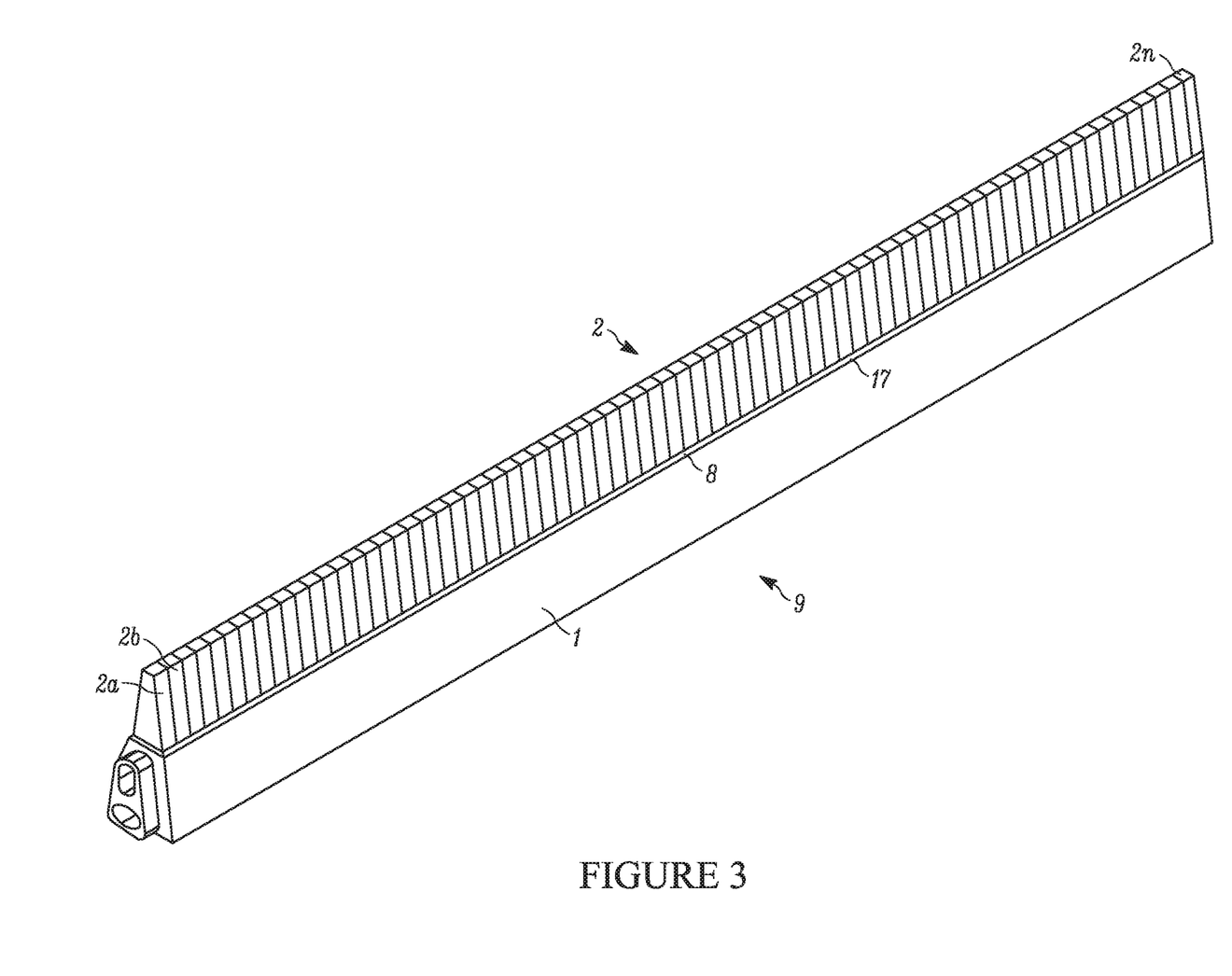
FIG. 3 is a front view of the secured parts of FIG. 1.

The present invention relates to cooling device and, in particular, relates to a fixture for securing together components of a cooling device. FIGS. 1-3 illustrate an apparatus 10 including a fixture or support bar 3 for joining, e.g., soldering or brazing, two parts 1, 2 together along an interface 8 therebetween to form an integrated unit 9. As shown, the support bar 3 is elongated and includes a first cavity 11 for receiving the parts 1, 2. The first cavity 11 extends along the length of the support bar 3. It will be appreciated that the support bar 3 can have alternative shapes or constructions, e.g., arcuate, multi-part, etc., depending on the configuration of the parts 1, 2 and/or the configuration of the interface 8. The support bar 3 is formed form a thermally conductive material such as steel, carbon steel, aluminum or copper.

Referring to FIG. 2, the support bar 3 includes at least one second cavity 13 for receiving a corresponding number of electric heating elements such as cartridge heaters 4 or any conventional heating element powered by electricity. Although one cartridge heater 4 is shown multiple cartridge heaters could be provided. In such a construction, the cartridge heaters 4 can extend parallel to one another or at angles relative to one another. Moreover, the cartridge heater 4 can be secured to an outer surface of the support bar 3 and in contact therewith (not shown).

One or more cooling passages or channels 7 extend the length of the support bar 3. Each cooling channel 7 is connected to piping in fluid communication with a coolant supply 19 (see FIG. 1), which can include cooling mediums such as air and liquid, e.g., air, water, water/glycol mixture, oil. The cooling medium can be supplied to the cooling channel 7 by conventional means including a fan/blower and a pump associated with the coolant supply 19. Each cooling channel 7 can be circular (as shown) or polygonal and multiple cooling channels could be same as one another or different in shape, length, size, etc. As shown, a single, circular cooling channel 7 is provided in the support bar 3.

Referring to FIG. 3, the parts 1, 2 to be connected together can each formed from thermally conductive materials, e.g., aluminum or copper-based materials. The part 2 is a tab defined by a stack of lamination layers 2a-2n of material, where n is a desired number of layers collectively extending substantially the entire length of the part 1. The part 1 and each of the layers 2a-2n can be made from the same material or different materials from one another. Insulating layers (not shown) can be provided between each consecutive pair of layers 2a-2n.

Figure 4:
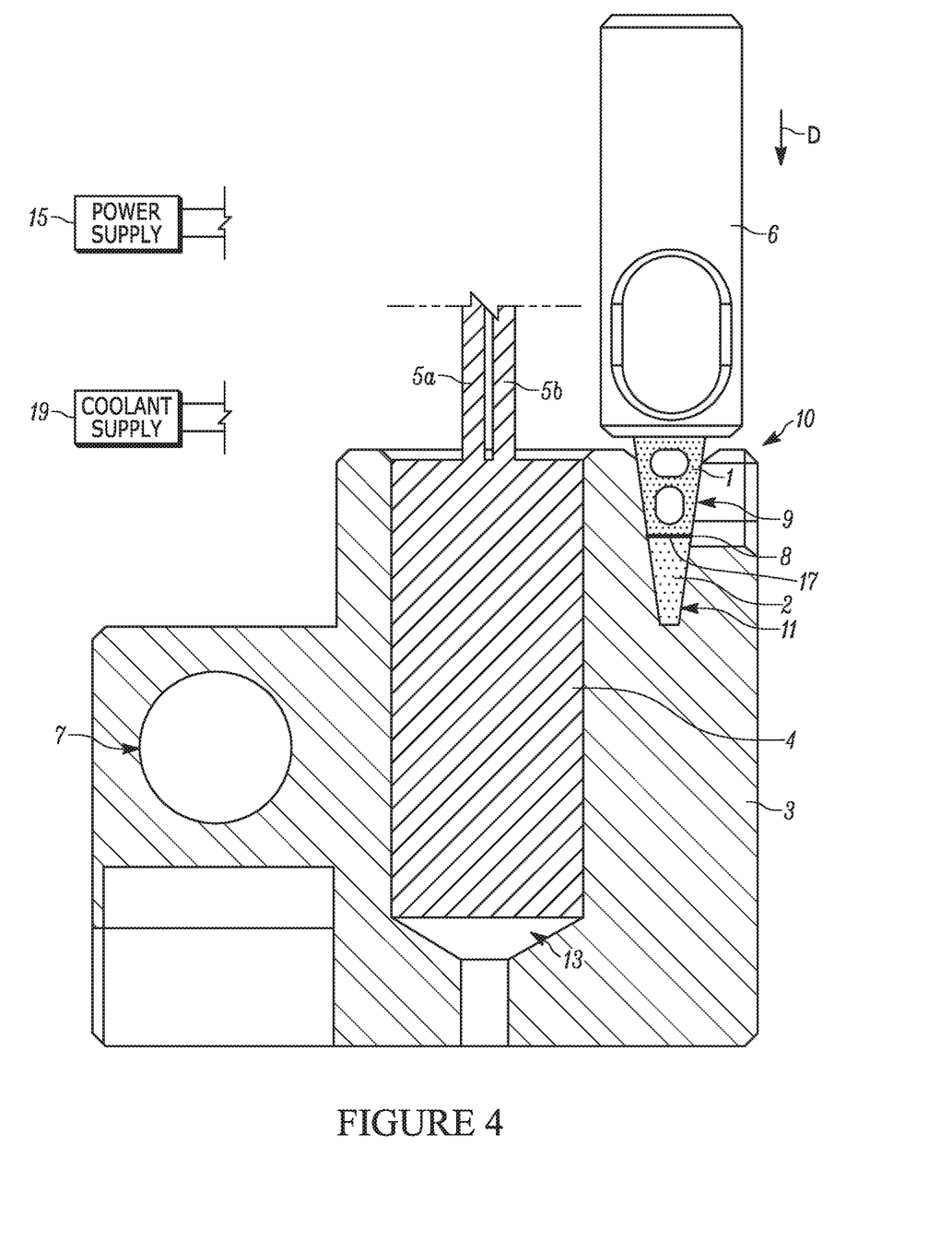
FIG. 4 is a section view of both the fixture and the parts of FIG. 1 taken along line 4-4.

As shown in FIG. 4, when the device is assembled the cartridge heater 4 is positioned in the second cavity 13 and can directly engage the support bar 3. A pair of wires 5a, 5b extends from the cartridge heater 4 and electrically connects the cartridge heater to a power supply 15.

When it is desirable to join the parts 1, 2 together, a filler metal such as solder or braze 17 is positioned between the parts 1, 2 along the interface 8. The filler metal 17 can be formed from, for example, solder or braze foil, wire, ribbon or paste (powdered solder/braze and flux). The parts 1, 2 are positioned within the first cavity 11 in the support bar 3 with the filler metal 17 along the interface 8. In this position, one or both of the parts 1, 2 abuts the wall of the support bar 3 defining the first cavity 11. Alternatively, an air gap (not shown) exists between the support bar 3 and one or both parts 1, 2.

A conductive clamp 6 connected to an actuator (not shown) is extended downwards towards the support bar 3 in the direction D and engages the first part 1. The clamp 6 firmly clamps against the first part 1 to ensure the first and second parts 1, 2 do not move relative to one another or relative to the support bar 3 during the joining process. Clamping also ensures the filler metal 17 maintains engagement with both parts 1, 2 along the interface 8.

The power supply 15 provides power to the cartridge heater 4 using the wires 5a, 5b, thereby increasing its temperature and generating heat. Heat from the cartridge 4 heater flows via conduction into the support bar 3 due to the abutment therebetween. This conduction, in turn, conducts heat to the parts 1, 2 in the first cavity 11, thereby heating the parts and activating the filler metal 17 along the interface 8. Eventually, the filler metal 17 temperature rises to a degree sufficient to melt. In other words, the cartridge heater 4 heats the support bar 3 sufficient to raise the temperature of the filler metal 17 above its melting point.

The power supplied to the cartridge heater 4 can be controlled voltage, current, and power. Controlled power is advantageous in that it provides for the most consistent solder or braze connection between the parts 1, 2 along the interface 8. That said, a desirable solder or braze reflow profile can also be achieved using variable power.

To this end, the power provided by the power supply 15 to the cartridge heater 4 can be specifically tailored to produce a desired flow in the filler metal 17. Power to the cartridge heater 4 can be varied over time to produce a predetermined heating curve or profile and/or varied with a predetermined function based on the temperature of the support bar 3. For example, the power can be adjusted using any mathematical equation based on time and temperature, e.g., with a piecewise linear function which changes the power based on timing. If multiple cartridge heaters 4 are provided, power supplied to the cartridges heaters can vary or be the same between different cartridge heaters. In any case, the power supply 15 is shut off/deactivated and the cartridge heaters 4 de-energized once the filler metal 17 is sufficiently heated/melted to form metallurgical bonds between the filler metal and each part 1, 2.

The cooling channel 7 in the support bar 3 can subsequently be used, when desired, to expedite the cooling process for the melted filler metal 17. It will also be appreciated that the cooling channel 7 could be omitted or not used to allow the melted filler metal 17 to passively cool, i.e., naturally/without forced conduction.

Supplying air or liquid cooling medium from the coolant supply 19 to the cooling channel 7 draws heat from support bar 3, thereby cooling the parts 1, 2 and filler metal 17. That said, the flow characteristics through the cooling channel 7, e.g., the type of air or liquid used, flow rate, and/or duration, can be specifically tailored to produce a desired solidification of the filler metal 17 to rigidly secure the parts 1, 2 together to from the unit 9.

In one example, the cooling process is configured to rapidly cool the filler metal 17. Air from the coolant supply 19 is first forced through the cooling channel 7 to lower the temperature of the support bar 3 and, thus, lower the temperature of the parts 1, 2 and filler metal 17. Using air first in the cooling process when the support bar 3 and parts 1, 2 are the hottest helps prevent undesirable stress therein due to the low thermal conductivity of air. When the support bar 3 reaches an acceptable temperature, which can be verified via sensor or the like, airflow through the cooling channel 7 ceases. Liquid from the coolant supply 19 is then pumped through the cooling channel 7 to quickly cool the support bar 3, parts, 1, 2, and filler metal 17.

In another example, following the use of air, a high temperature liquid (e.g. SYLTHERM 800 Stabilized HTF) having a boiling point above the highest predicted temperature of the support bar 3 is pumped through the cooling channel 7. Using a liquid that does not boil during cooling maintains reasonable levels of heat transfer through the system and helps avoid high thermal stresses in the support bar 3 and parts 1, 2. In any case, liquid supply to the cooling channel 7 is stopped once the support bar 3, parts 1, 2, and filler metal 17 are sufficiently cooled.

The clamp 6 is then retracted from the parts 1, 2 and the assembled unit 9 formed from the parts 1, 2 fixed together with solidified filler metal 17 removed from the support bar 3. From the above, it is clear that the use of air and liquid in the cooling channel 7 allows the support bar 3 and parts 1, 2 to cool in a controlled manner while also cooling the melted filler metal 17 until solidification, thereby rigidly securing the parts together as an integrated unit 9 with metallurgical bonds between the filler metal and parts.

The material used to form the support bar 3 can be selected to maximize conduction from the cartridge heater 4 to the parts 1, 2 and filler metal 17. To this end, carbon steel is a desirable material adapted to conduct heat through the support bar 3. The support bar 3 material can also be selected to prevent adhesion between the melting or solidifying filler metal 17 and the wall of the support bar defining the first cavity 11. In one example, the support bar 3 is chrome plated at least in the area of the first cavity 11 since the filler metal 17 will not adhere to the chrome plating. It will be appreciated that other materials and/or methods of preventing adhesion between the support bar 3 and filler metal 17 can be used such as plated aluminum or bare stainless steel.

Figure 5:
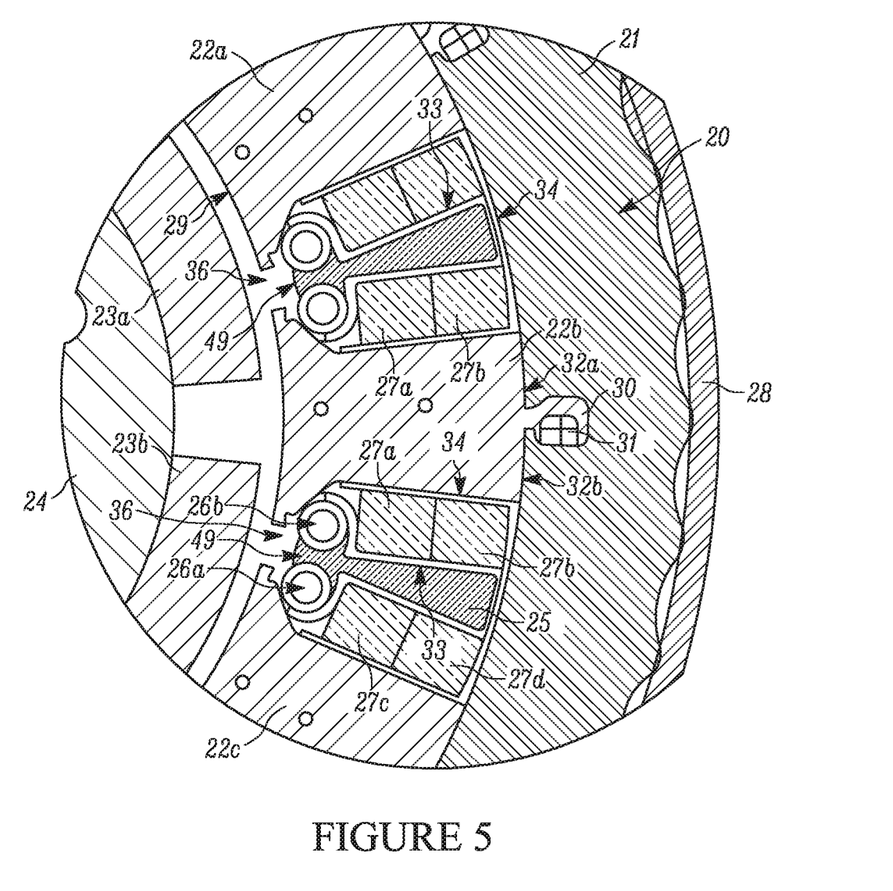
FIG. 5 is a portion of a machine having a cooling bar secured together using another fixture.
Figure 6:
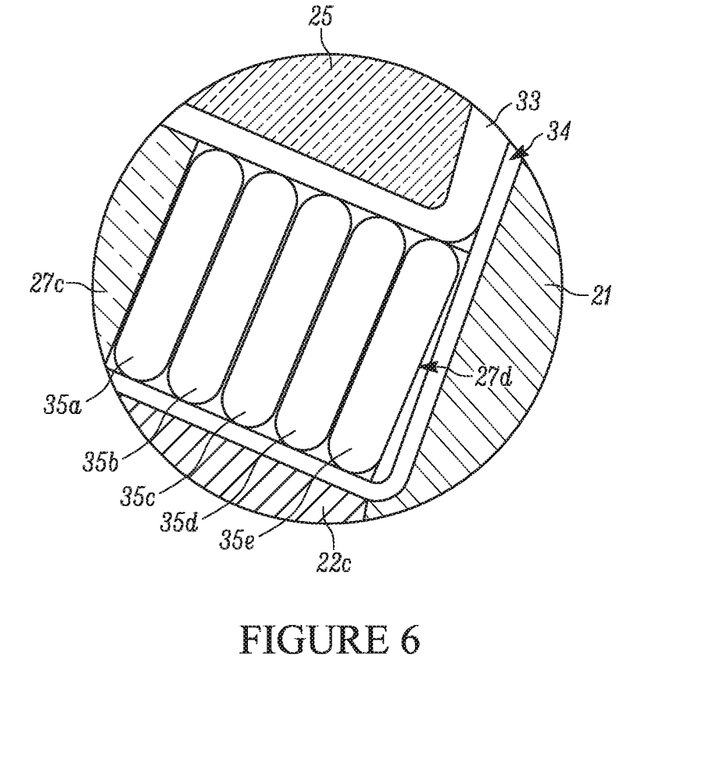
FIG. 6 is an enlarged view of a portion of FIG. 5.

FIGS. 5-8 illustrate a cooling bar 49 used in a machine, e.g., an electric rotary machine such as a motor or generator, and formed using an apparatus of the present invention. Referring to FIG. 5, the machine includes a rotor assembly 24 rotatable within and relative to a stationary stator assembly 20. A plurality of permanent magnets 23a, 23b are secured to the periphery of the back iron of the rotor assembly 24. The magnets 23a, 23b and back iron are rotatable together about a central axis (not shown) of the machine. The stator assembly 20 includes an outer lamination 21. A plurality of teeth 22a, 22b, 22c is secured to the outer lamination 21 in an annular pattern. The outer lamination 21 and teeth 22a, 22b, 22c can be formed from laminated silicon steel.

The teeth 22a, 22b, 22c extend radially towards the central axis and are circumferentially spaced apart from one another to define a series of slots 36. A cooling bar 49 is provided in each slot 36 and extends the entire axial length of the slot between each pair of adjacent teeth 22a, 22b, 22c. In other words, the cooling bars 49 are the same—or substantially the same—axial length as the teeth 22a, 22b, 22c.

Each cooling bar 49 includes a pair of fluid passageways 26a, 26b and a tab 25. It will be appreciated that the cooling bar 49 could include more or fewer fluid passageways. In any case, the tab 25 supports the fluid passageways 26a, 26b and extends radially outward towards the outer can 28. Each cooling bar 49 is surrounded by a thermal interface material or layer 33 formed from, for example, a silicon-based material.

A series of windings or wire bundles 27a, 27b, 27c, 27d are wound around the teeth 22a, 22b, 22c, e.g., wound around every other tooth or around every third tooth. As shown, a pair of bundles stacked in the radial direction are wound around each individual tooth, e.g., the bundles 27a, 27b are wound around the tooth 22b and the bundles 27c, 27d wound around the tooth 22c.

Each wire bundle 27a-27d is formed from multiple strands of rectangular wire. In one example, the wire bundle 27d adjacent the outer lamination 21 includes individual wire strands 35a-35e stacked in the radial direction (see FIG. 6). The wire bundles 27a-27d are physically separated from the cooling bars 49 by the thermal interface material 33. The wire bundles 27a-27d are also electrically insulated from the teeth 22a, 22c and outer lamination 21 by slot liners 34 formed from, for example, polyimide tape or nomex paper, which add to the electrical insulation on the wires. Consequently, each set of wire bundles 27a-27d is circumferentially sandwiched between the thermal interface material 33 and the slot liner 34.

Referring back to FIG. 5, the tab 25 of each cooling bar 49 is positioned circumferentially between the wire bundles associated with one tooth, e.g., the wire bundles 27a, 27b around the tooth 22b, and the wire bundles associated with the adjacent tooth, e.g., the wire bundles 27c, 27d around the tooth 22c. The fluid passageways 26a, 26b of each cooling bar 49 are positioned radially between the wire bundles on one tooth and the radially inner portion of that tooth, e.g., between the inner radial extent of the tooth 22b and the wire bundles 27a, 27b.

Each tooth 22a, 22b, 22c includes a hook-shaped, resilient tab 30 for securing the tooth to the outer lamination 21. In particular, each tab 30 extends into an opening or slot in the outer lamination (not shown). A corresponding wedge 31 is inserted between a portion of the outer lamination 21 and the tab 30 to deflect the tab outward into engagement with the outer lamination 21 in a manner that prevents relative axial and radial movement between the tooth 22a, 22b, 22c and the outer lamination. The wedge 31 urges the tab 30 radially outward to pull the tooth 22b radially outward into biased engagement with the outer lamination 21 along interface surfaces 32a, 32b on opposite sides of the tab 30. The remaining teeth 22a, 22c are secured to the outer lamination 21 in the same manner.

Figure 7:
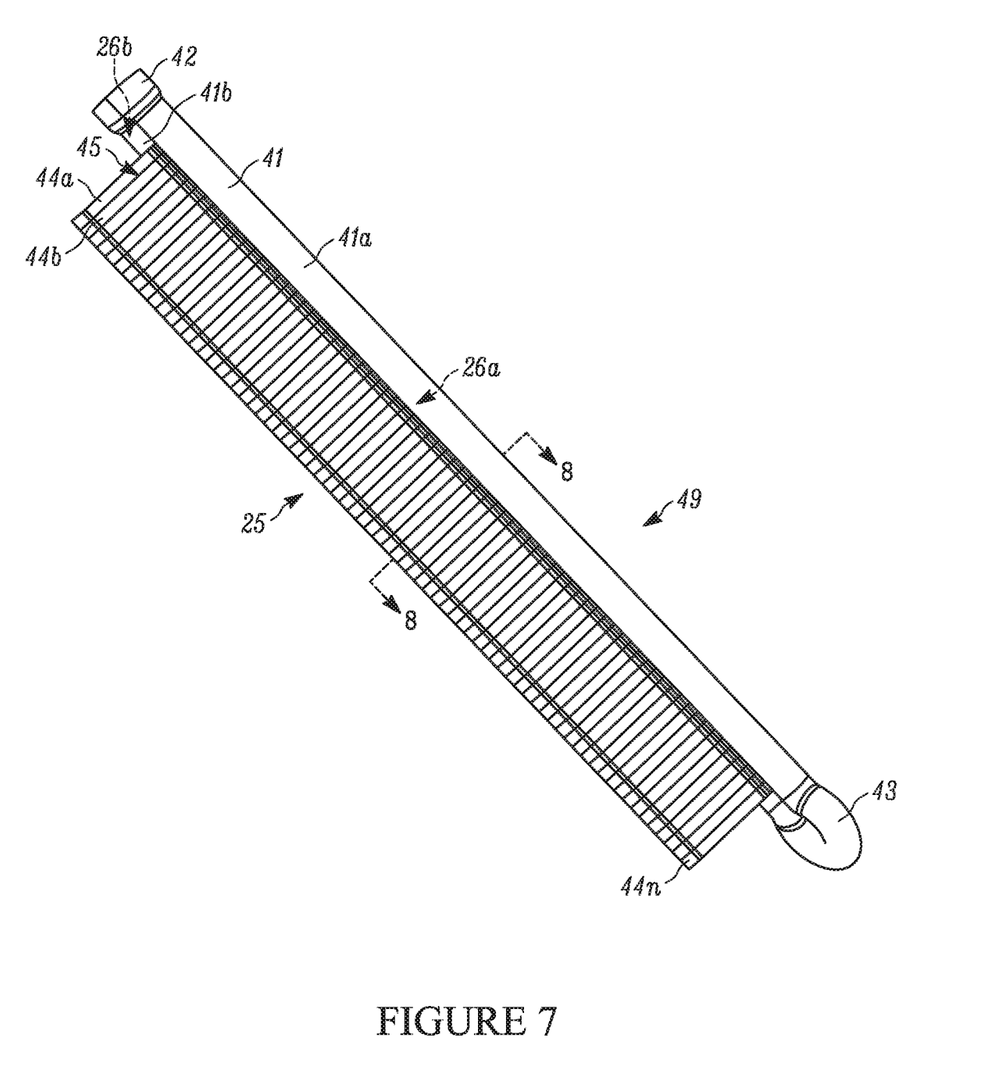
FIG. 7 is a side view of the cooling bar of FIG. 5.

FIG. 7 illustrates the cooling bar 49 in more detail. The cooling bar 49 includes a single, extruded pipe 41 bent along its length through a hairpin or U-shaped turn 43 and formed from a thermally conductive material, e.g., aluminum, steel, carbon steel or copper. This bend divides the pipe 41 into a pair of pipe sections 41a, 41b that define each the coolant passageway 26a. 26b. The pipe 41 can be circular or round (as shown) or have a polygonal shape (not shown). The pipe 41 is connected to a coolant fluid supply through a flare 42 provided at an end of the bent pipe opposite the hairpin 43. The hairpin 43 allows coolant to flow bidirectionally through the cooling bar 49, e.g., in a first direction through the coolant passageway 26a and in a second, opposite direction through the coolant passageway 26b (left-to-right then right-to-left as viewed in FIG. 7).

The tab 25 has a generally trapezoidal or quadrilateral shape defined by a stack of lamination layers 44a-44n. The laminations layers 44a-44n are formed from a thermally conductive material such as copper or aluminum. The material selection can be the same or vary between layers 44a-44n and can be the same or different from the pipe 41 material. The lamination layers 44a-44n extend between the pipe sections 41a, 41b and axially between the flare 42 and the hairpin 43. An electrically insulating layer 45 is provided between each and every pair of conductive layers 44a-44n for electrically insulating the cooling bar 49.

Figure 8:
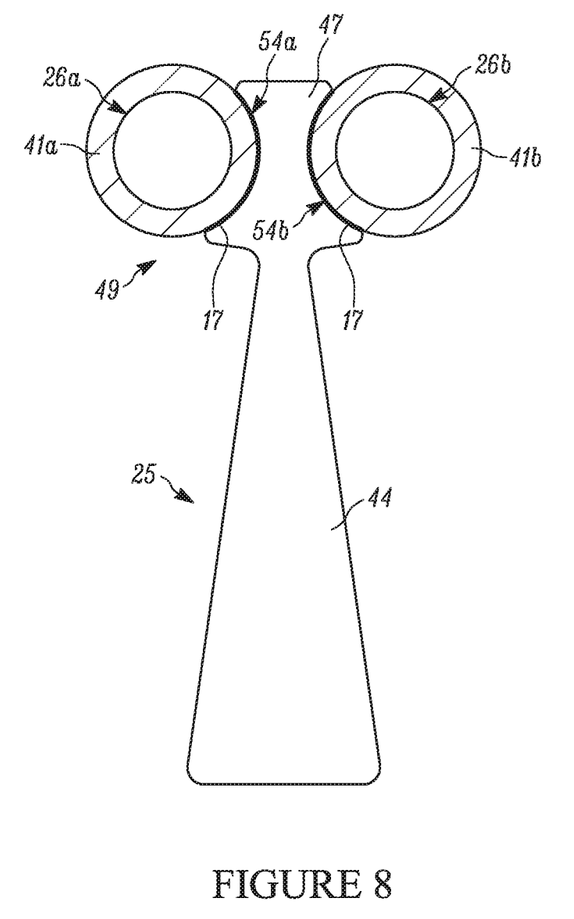
FIG. 8 is a section view of the cooling bar of FIG. 7 taken along line 8-8.

FIG. 8 illustrates the orientation of the coolant passageways 26a, 26b relative to the tab 25. The tab 25 includes a projection 47 for spacing the pipe sections 41a, 41b apart from one another, thereby separating the coolant passageways 26a, 26b from one another. In one example, the tab 25 is symmetric such that the coolant passageways 26a, 26b are symmetrically positioned on opposite sides of the projection 47. Asymmetric configurations for the tab 25 are also contemplated (not shown).

The pipe sections 41a, 41b abut the projection 47 along a pair of respective surfaces or interfaces 54a, 54b. The pipe sections 41a, 41b and tab 25 are akin to the parts 1, 2 of FIGS. 1-3 and, thus, the components 25, 41a, 41b can be joined, e.g., soldered or brazed, together using an apparatus similar to the apparatus 10 of FIG. 1. That said, the interfaces 54a, 54b between the pipe sections 41a, 41b and the tab 25 are akin to the interface 8 between the parts 1, 2 of FIG. 1. Consequently, the solidified filler metal 17 extends along the interfaces 54a, 54b to rigidly secures the pipe sections 41a, 41b to the tab 25 with metallurgical bonds.

Figure 9:
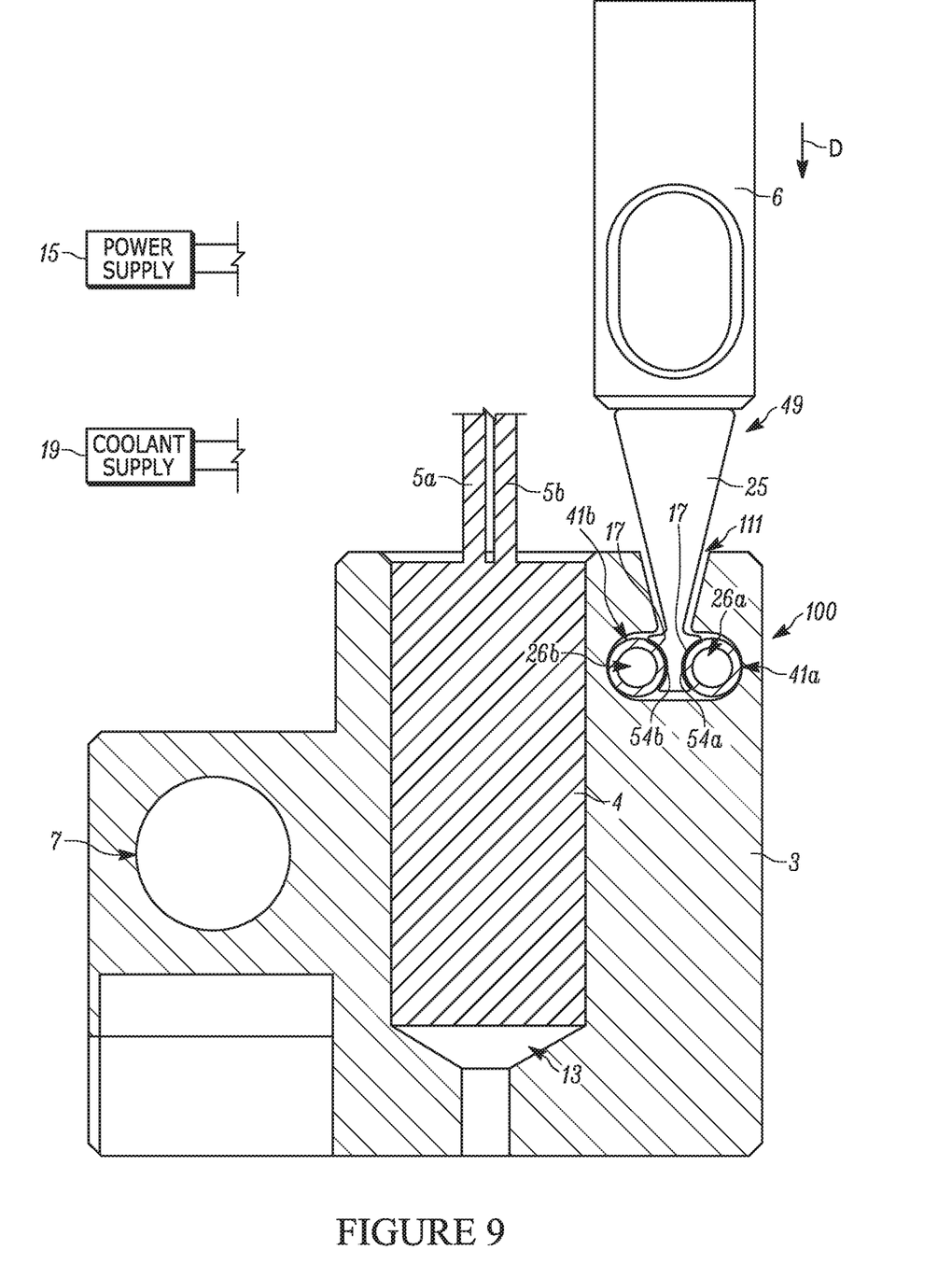
FIG. 9 is a section view of a fixture for forming the cooling bar of FIG. 7.

FIG. 9 illustrates an example apparatus 100 similar to the apparatus 10 of FIGS. 1 and 4 and used to form the cooling bar 49. The apparatus 100 includes the aforementioned support bar 3, cartridge heater(s) 4, wires 5a, 5b, cooling channel(s) 7, cavity 13, power supply 15, and coolant supply 19. The support bar 3 includes a first cavity 111 for accommodating the cooling bar 49. To this end, the cooling bar 49 can be inserted either axially or laterally into the first cavity 111, depending on its outer contour. Alternatively, the support bar 3 can be formed from two or more separate pieces (not shown) that allow the cooling 49 to be provided in the first cavity 111 when disassembled and secured within the first cavity when the pieces are assembled in the condition shown in FIG. 9.

A filler metal 17 is applied along the interfaces 54a, 54b prior to positioning the cooling bar 49 in the first cavity 111. At least one of the tab 25 and pipe portions 41a, 41b is in contact with the support bar 3 along the entire axial length of the interfaces 54a, 54b when positioned in the first cavity 111. As shown, both pipe portions 41a, 41b engage the support bar 3. It will be appreciated that an air gap can exist between the support bar 3 and either the tab 25 or one/both of the pipe portions 41a, 41b while maintaining functionality of the apparatus 100.

The clamp 6 is extended downward towards the support bar 3 in the direction D and engages the leading surface of the tab 25. The clamp 6 firmly clamps against the tab 25 to ensure the tab and pipe portions 41a, 41b do not move relative to one another or relative to the support bar 3 during the soldering process. Clamping also ensures the filler metal 17 maintains engagement with both the tab 25 and pipe portions 41a, 41b along the interfaces 54a, 54b.

The power supply 15 provides power to the cartridge heater 4 using the wires 5a, 5b in a controlled manner—constant or variable. In any case, the heated cartridge heater 4 conductively heats the support bar 3, thereby heating the components 25, 41a, 41b and filler metal 17 in the same way the aforementioned parts 1, 2 are conductively heated. Eventually, the filler metal 17 temperature rises to a degree sufficient to melt and form metallurgical bonds between the filler metal and each of the components 25, 41a, 41b. The power supply 15 is then shut off.

Air and/or liquid can then supplied by the coolant supply 19 to the cooling channel 7 in any of the manners described. The flow characteristics through the cooling channel 7, e.g., the type of air or liquid used, flow rate, and/or duration, can be specifically tailored to produce a desired solidification of the filler metal 17 to rigidly secure the tab 25 and pipe portions 41a, 41b together to from the cooling bar 49. Once the cooling bar 49 is removed from the apparatus 100 it can be positioned within the stator assembly 20 in the configuration and orientation shown in FIG. 5, e.g., in the slots 36 between adjacent teeth 22a-22c.

Referring to FIG. 5, in operation, magnetic flux travels from the magnet 23b, through the tooth 22c, through the outer lamination 21, through the tooth 22b, through the magnet 23a, through the back iron on the rotor 24, and back to the magnet 23b. This magnetic flux path is repeated between rotor 24 magnets and corresponding stator 20 teeth about the entire circumference of the rotor and stator.

Magnetic flux prefers to travel through magnetic materials, such as the steel stator lamination 21, rather than through non-magnetic materials, such as the aluminum or copper lamination layers 44a-44n in the cooling bar 49. That said, some small portion of this magnetic flux (called leakage flux) will travel in a direction from the tooth 22c to the tooth 22b, passing through the copper or aluminum lamination layers 44a-44n. In other words, the leakage flux bypasses the outer lamination 21 and instead travels circumferentially from one tooth 22c to another 22b via the slot 36 therebetween.

When this magnetic flux passes through conductive materials, it induces eddy currents, which are losses that reduce the motor efficiency. Consequently, since the cooling tab 25 is made from lamination layers 44a-44n separated by insulating layers 45, the eddy current losses are advantageously reduced. Eddy current losses in these lamination layers 44a-44n are proportional to the thickness of the particular layer squared and, thus, adjusting the thickness of any one or more lamination layers affects directly affects Eddy current loses.

Figure 10:
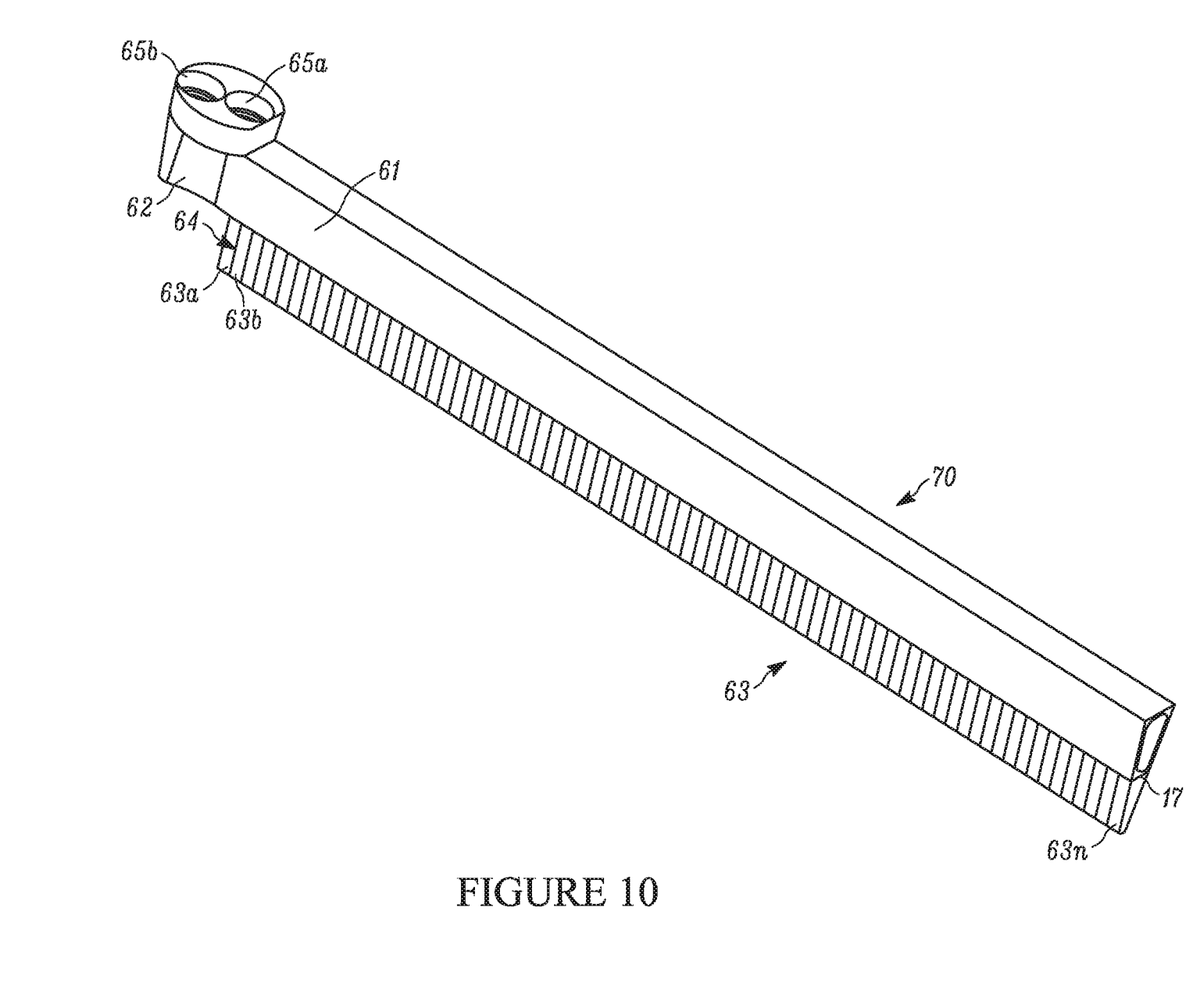
FIG. 10 is a front view of an alternative cooling bar for the machine of FIG. 5.
Figure 11:
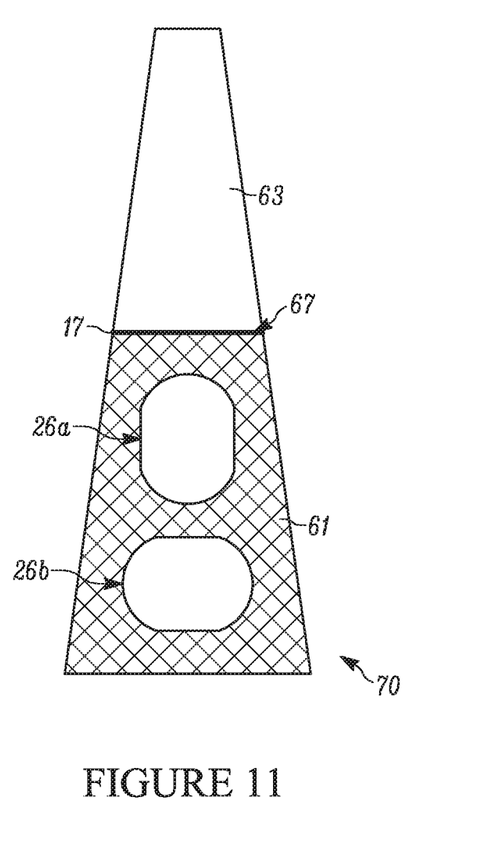
FIG. 11 is a right end view of the cooling bar of FIG. 10.

FIGS. 10-11 illustrate another example cooling bar 70 in accordance with the present invention. The cooling bar 70 can be used in, for example, a motor or generator similar to that shown in FIG. 5. The cooling bar 70 includes a tab 63 and an extruded pipe 61. Using an extruded pipe 61 to form the cooling bar 70 is advantageous in that the unlayered pipe 41, when positioned in the stator assembly 20, is closer to the outer diameter of the motor where there is less leakage flux and therefore lower eddy current losses.

Each of the pipe 61 and the tab 63 has a generally trapezoidal or quadrilateral shape, although other shapes are contemplated. Both the pipe 61 and the tab 63 can be formed from a thermally conductive material, e.g., aluminum or copper. The materials for the pipe 61 and the tab 63 can be the same or different from one another.

The pipe 61 defines the pair of coolant passageways 26a and 26b, which are fluidly connected to supply and return pipes 65a, 65b by a connection 62 at one end of the cooling bar 70. The tab 63 is defined by a stack of lamination layers 63a-63n formed from a thermally conductive material, e.g., aluminum or copper. An electrically insulating layer 64 is provided between each and every pair of conductive layers 63a-63n for electrically insulating the cooling bar 70. The tab 63 abuts the pipe 61 along a planar interface 67 and, thus, the tab does not extend between the coolant passageways 26a, 26b.

The pipe 61 and tab 63 are akin to the parts 1, 2 of FIGS. 1-3 and, thus, the pipe and tab can be joined, e.g., soldered or brazed, together using an apparatus similar to the apparatus 10 of FIG. 1. That said, the interface 67 between the pipe 61 and the tab 63 is akin to the interface 8 between the parts 1, 2 of FIG. 1. Consequently, solidified filler metal 17 extends along the interface 67 to rigidly secures the pipe 61 to the tab 63 with metallurgical bonds.

Figure 12:
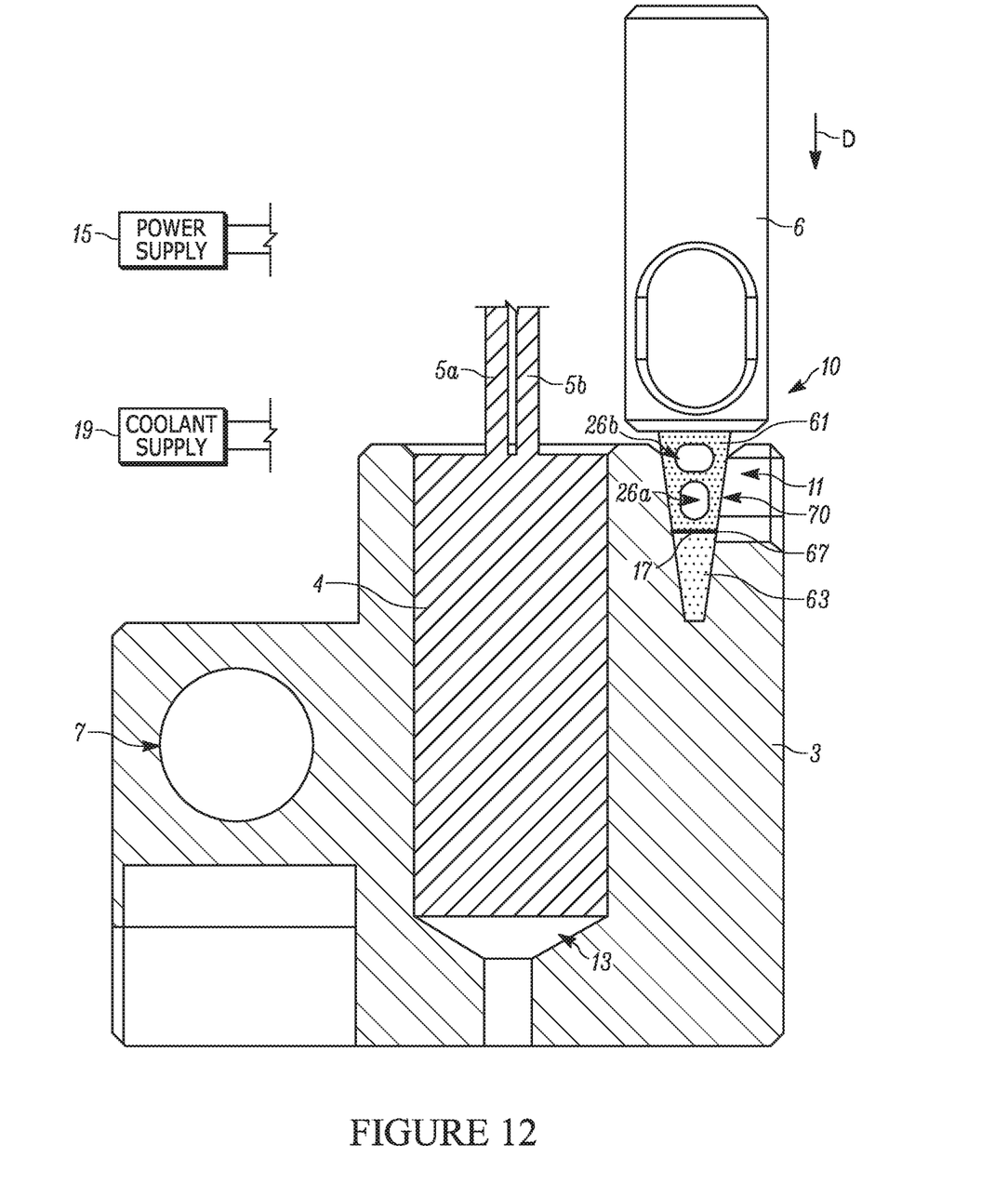
FIG. 12 is a section view of a fixture for forming the cooling bar of FIG. 10.

FIG. 12 illustrates the cooling bar 70 being formed using the apparatus 10 of FIGS. 1 and 4. In this process, the first cavity 11 accommodates the cooling bar 70. To this end, the cooling bar 70 can be inserted either axially or laterally into the first cavity 11, depending on its outer contour.

Filler metal 17 is applied along the interface 67 prior to positioning the cooling bar 70 in the first cavity 11. At least one of the pipe 61 and the tab 63 is in contact with the support bar 3 along the entire axial length of the interface 67 when positioned in the first cavity 11. As shown, both the pipe 61 and tab 63 engage the support bar 3. It will be appreciated that an air gap can exist between the support bar 3 and either the pipe 61 or the tab 63 while maintaining functionality of the apparatus 10.

The clamp 6 is extended downward towards the support bar 3 in the direction D and engages the leading surface of the pipe 61. The clamp 6 firmly clamps against the pipe 61 to ensure the pipe and tab 63 do not move relative to one another or relative to the support bar 3 during the soldering process. Clamping also ensures the filler metal 17 maintains engagement with both the pipe 61 and tab 63 along the interface 67.

The power supply 15 provides power to the cartridge heater 4 using the wires 5a, 5b in a controlled manner—constant or variable. In any case, the heated cartridge heater 4 conductively heats the support bar 3, thereby heating the pipe 61, tab 63, and filler metal 17 in the same way the aforementioned parts 1, 2 are conductively heated. Eventually, the filler metal 17 temperature rises to a degree sufficient to melt and form metallurgical bonds between the filler metal and each of the components 61, 63. The power supply 15 is then shut off.

Air and/or liquid can then supplied by the coolant supply 19 to the cooling channel 7 in any of the manners described. The flow characteristics through the cooling channel 7, e.g., the type of air or liquid used, flow rate, and/or duration, can be specifically tailored to produce a desired solidification of the filler metal 17 to rigidly secure the pipe 61 and tab 63 together to from the cooling bar 70.

Once the cooling bar 70 is removed from the apparatus 10 it can be positioned within the stator assembly 20 in a manner similar to the configuration and orientation shown in FIG. 5, e.g., in the slots 36 between adjacent teeth 22a-22c with the tab 63 positioned radially outward of the pipe 61. Moreover, it will be appreciated that the unit 9 in FIGS. 1-4 could likewise be used as a cooling bar in a motor or generator.

Although only a pair of parts or components are shown being joined together using the support bar of the present invention, it will be appreciated that the support bar can be configured to receive any number of components to be joined together via thermal conduction to form metallurgical bonds between the filler metal and the components. Consequently, the number and/or location of the cartridge heaters and cooling channels can be adjusted accordingly.

The cooling bars of the present invention advantageously provide reduced eddy currents due to their reduced size, laminated tabs, and insulating layers provided between the lamination layers. Eddy current losses are proportional to thickness of the lamination layer or distance between insulating layers. The cooling bars are also advantageous in that they allow more heat to be generated in the windings while not exceeding a prescribed temperature limit, thereby allowing a greater current to be applied to the motor. This results in higher torque and power generation in a motor using the cooling bars of the present invention compared to the same sized motor which does not use the cooling bars.

The fixture of the present invention is advantageous in that is allows the soldering or brazing process to be precisely controlled through the entire reflow profile via the cooling channels and cartridge heaters, which can each be individually adjusted/tailored throughout the soldering or brazing process. Furthermore, using conduction to heat the parts and filler metal is faster and more efficient than convection and produces less wasted energy compared to convection. As a result, excellent solder or brazed joints with metallurgical bonds are created, which increases the reliability of the parts secured together.

The preferred embodiments of the invention have been illustrated and described in detail. However, the present invention is not to be considered limited to the precise construction disclosed. Various adaptations, modifications and uses of the invention may occur to those skilled in the art to which the invention relates and the intention is to cover hereby all such adaptations, modifications, and uses which fall within the spirit or scope of the appended claims.

Having described the invention, the following is claimed:

1. A cooling bar for a winding slot in an electric rotary machine comprising:
   a thermally conductive pipe defining a plurality of coolant passageways in the same winding slot; and
   a tab secured to the pipe along an interface by filler metal metallurgically bonded to the tab and the pipe and being configured for placement between multiple windings in the same winding slot.

2. The cooling bar of claim 1, wherein the tab comprises a plurality of laminations formed from thermally conductive material and stacked on one another.

3. The cooling bar of claim 2 further comprising electrical insulation provided between adjacent laminations.

4. The cooling bar of claim 1, wherein the tab and the pipe collectively form an external shape that is generally trapezoidal.

5. The cooling bar of claim 1, wherein the pipe has more than one separate passageway for fluid to flow.

6. The cooling bar of claim 2, wherein the laminations extend between the coolant passageways in the same winding slot.

7. The cooling bar of claim 1, wherein a hairpin turn connects the coolant passageways such that coolant flows bidirectionally through the cooling bar within the same winding slot.

8. The cooling bar of claim 1, wherein the pipe is a bent tube.

9. The cooling bar of claim 1, wherein the pipe is extruded.

10. The cooling bar of claim 1, wherein the pipe and the tab are formed from non-magnetic materials.

11. The cooling bar of claim 1, wherein the pipe is bent such that the tab is secured to and engages the pipe at multiple, spaced apart locations.

12. The cooling bar of claim 1, wherein the coolant passageways are configured to be radially aligned with the tab when the tab is placed in the winding slot.

13. The cooling bar of claim 1, wherein only one tab is secured to the pipe, the tab being configured to extend along its entire length along a centerline in a radial direction of the winding slot and be positioned along the circumferential center of the winding slot.

14. A cooling bar for a winding slot in an electric rotary machine comprising:
   a thermally conductive pipe defining a plurality of coolant passageways and including a hairpin turn for connecting the coolant passageways such that coolant flows bidirectionally through the cooling bar within the same winding slot; and
   a non-magnetic tab secured to the pipe along an interface by filler metal metallurgically bonded to the tab and the pipe and configured for placement between multiple windings in the same winding slot.

15. The cooling bar of claim 14, wherein the pipe is bent such that the tab is secured to and engages the pipe at multiple, spaced apart locations.

16. The cooling bar of claim 14, wherein the coolant passageways are configured to be radially aligned with the tab when the tab is placed in the winding slot.

17. The cooling bar of claim 14, wherein only one tab is secured to the pipe, the tab being configured to extend along its entire length along a centerline in a radial direction of the winding slot and be positioned along the circumferential center of the winding slot.

18. The cooling bar of claim 1, wherein the tab is configured to extend along its entire length along a centerline extending only in a radial direction of the winding slot.

19. The cooling bar of claim 1, wherein the interface is planar.

20. The cooling bar of claim 1, wherein the interface extends around only a portion of the perimeter of the pipe.

21. The cooling bar of claim 14, wherein the tab is configured to extend along its entire length along a centerline extending only in a radial direction of the winding slot.

22. The cooling bar of claim 14, wherein the interface is planar.

23. The cooling bar of claim 14, wherein the interface extends around only a portion of the perimeter of the pipe.

24. A cooling bar for a winding slot in an electric rotary machine comprising:
- a thermally conductive structure defining a plurality of separate coolant passageways in the same winding slot for fluid to flow; and
- a tab comprising a plurality of laminations formed from thermally conductive material and stacked on one another with electrical insulation provided between adjacent laminations, the tab being secured to the structure along an interface by filler metal metallurgically bonded to the tab and the structure and being configured for placement between multiple windings in the same winding slot.

25. The cooling bar of claim 1, wherein the tab extends radially within the winding slot along a centerline and the coolant passageways are provided on opposite sides of the centerline such that all the coolant passageways in the machine are circumferentially aligned with one another.

26. The cooling bar of claim 1, wherein all the coolant passageways are positioned radially inward of the windings.

27. The cooling bar of claim 14, wherein the tab extends radially within the winding slot along a centerline and the coolant passageways are provided on opposite sides of the centerline such that all the coolant passageways in the machine are circumferentially aligned with one another.

28. The cooling bar of claim 14, wherein all the coolant passageways are positioned radially inward of the windings.

* * * * *